(No Model.)

W. H. TAYLOR.
TOOL FOR FORMING KEY SLOTS IN LOCKS.

No. 514,248. Patented Feb. 6, 1894.

Witnesses
Louis G. Julihn.
Eric G. Julihn.

Inventor
W. H. Taylor.
By Hopkins and Atkins
Attorneys

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

TOOL FOR FORMING KEY-SLOTS IN LOCKS.

SPECIFICATION forming part of Letters Patent No. 514,248, dated February 6, 1894.

Application filed June 6, 1892. Serial No. 435,656. (No model.)

*To all whom it may concern:*

Be it known that I, WARREN H. TAYLOR, of Stamford, county of Fairfield, and State of Connecticut, have invented a certain new and useful Tool for Forming Key-Slots in Locks, of which the following is a specification, reference being had to the accompanying drawings.

The object of my invention is to produce a tool that is adapted to make a key way in a lock cylinder narrower at some points than at others, and presenting sharp angles throughout its extent, thereby rendering it more obstructive to a picking tool It consists of a blade that will cut into a lock cylinder, for example a vertical slot, after the manner of an ordinary saw, and lateral cutting blade or blades that will cut a slot or slots at the sides of the vertical slot. Both the main or vertical blade and the lateral blade are inclined so that the broach, when first entered for cutting, produces a plain straight opening, and as the blade is pushed farther into the work it cuts deeper and forms the lateral slots.

Figure 3:
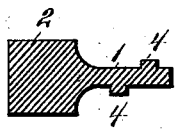
Figure 1:
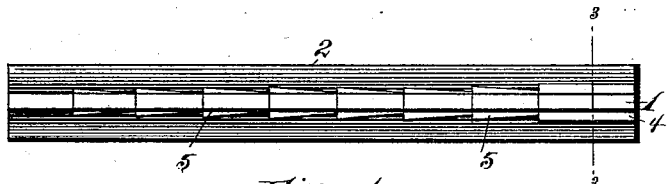
Figure 2:
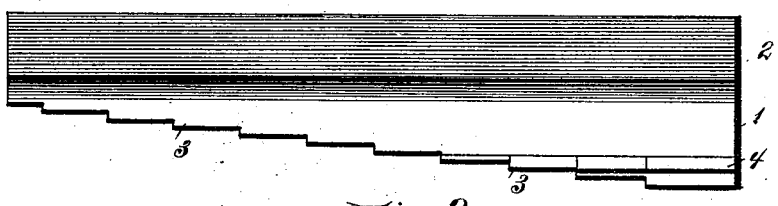

In the accompanying drawings, Figure 1 is a plan of a broach for producing one form of key slot, having lateral, rectangular edged flanges upon opposite sides. Fig. 2 is a side elevation of the same; Fig. 3 a cross section thereof on the line 3, 3, of Fig. 1. Figs. 4 and 5, and 6 and 7 are plan and sectional views respectively of different shaped broaches.

Referring to the figures on the drawings, 1 indicates the blade of the broach, preferably provided with a back or rib 2, for rendering it rigid, that may be integral with the blade or a separate part united to it. The blade of the broach should be formed of suitable hardened metal, and, should have the proper shape imparted to it before it is hardened. A blank may first be made, and may be provided by cutting or otherwise with an inclined edge upon which may be formed in any suitable manner teeth 3.

Figure 5:
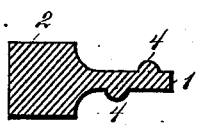
Figure 4:
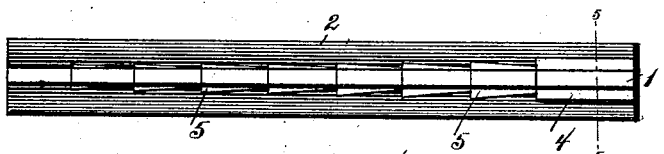
Figure 7:
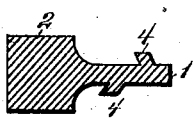
Figure 6:
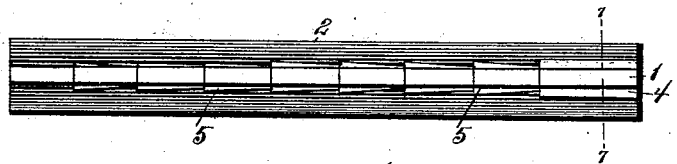

4 indicates lateral flanges formed in any suitable manner upon the side or sides of the blade, and inclined in the same direction as the edge of the blade. In other words the lateral flanges are wedge-shaped with their smaller ends extending toward the forward end of the inclined blade of the broach. These flanges may be of any desired width, and at right angles to the blade, or at any angle that the key-slot is desired to assume. As shown for example in Fig. 1, of the drawings, they may have a flat edge, or be rounded as shown in Fig. 5, or they may be modified in any desired way so as to give any particular form to the key slot.

5 indicates cutting teeth formed upon the lateral flanges.

My broach may be operated by hand, or by machinery in the usual manner.

I do not claim broadly in this application a broach blade having alternating angular recesses in its sides and an inclined cutting edge, because I have reserved that as a subject of a different application, namely, Serial No. 391,902.

What I claim is—

A broach having an inclined, toothed edge, and an inclined, toothed lateral flange arranged and adapted to be operated substantially as set forth.

In testimony of all which I have hereunto subscribed my name.

WARREN H. TAYLOR.

Witnesses:
SCHUYLER MERRITT,
GEO. E. WHITE.